May 6, 1958 D. M. WILLYOUNG 2,833,944
VENTILATION OF END TURN PORTIONS OF GENERATOR ROTOR WINDING
Filed July 22, 1957 2 Sheets-Sheet 1
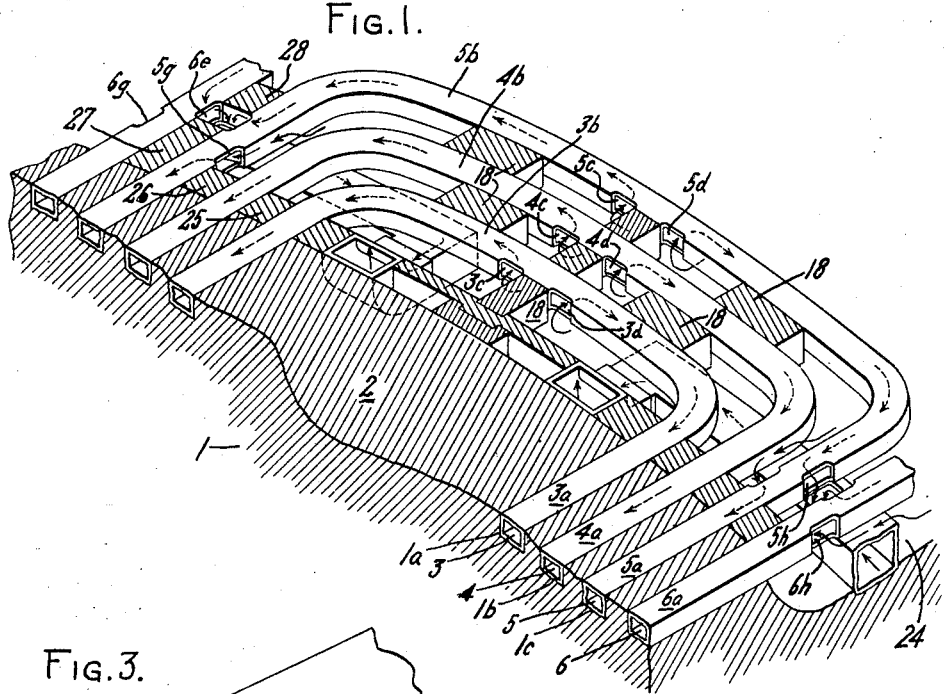
Inventor:
David M. Willyoung
by *Kiess*
His Attorney

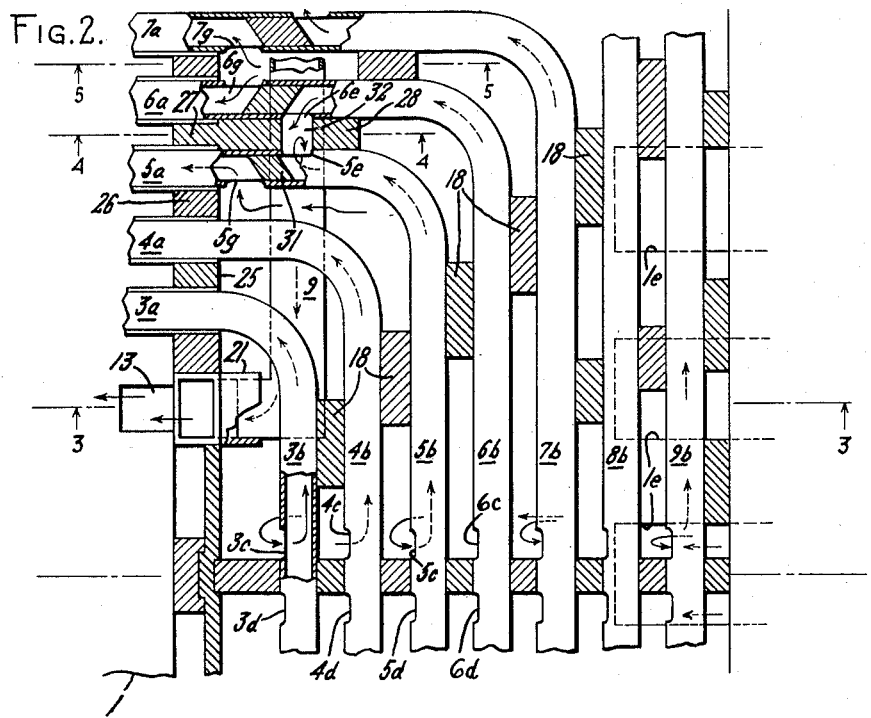
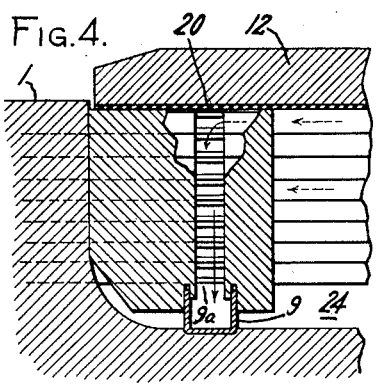
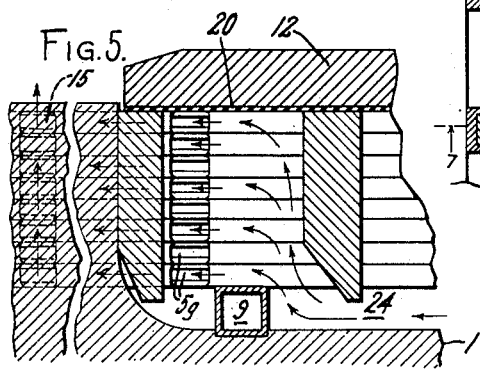
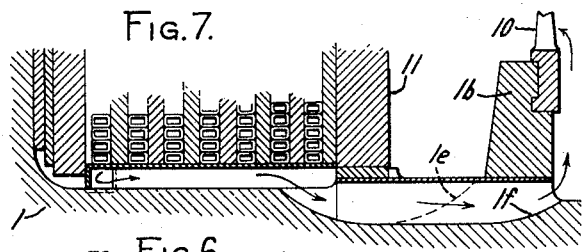
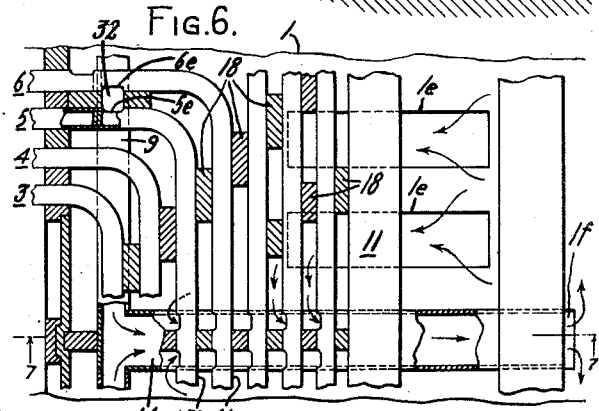
Inventor:
David M. Willyoung
by Kiess
His Attorney

United States Patent Office 2,833,944
Patented May 6, 1958

2,833,944
VENTILATION OF END TURN PORTIONS OF GENERATOR ROTOR WINDING

David M. Willyoung, Scotia, N. Y., assignor to General Electric Company, a corporation of New York Application July 22, 1957, Serial No. 673,451

5 Claims. (Cl. 310—61)

This invention relates to dynamoelectric machines, and more particularly to a method for cooling the end turn portions of the windings of a generator rotor.

It is well known that one of the main factors limiting the output of a large dynamoelectric machine, such as a turbine-generator, is the rise in temperature of the windings. In large generators, the windings have recently been cooled by placing the coolant gas in direct contact with the conductor to more effectively dissipate the heat from the windings. This method is called "direct cooling." In a rotor cooled in this manner, all or part of the windings are cooled by admitting cooling gas to passages within the conductor by means of ports located in the end turn portions, under the retaining rings. From these ports, the gas is carried through the conductor end windings and coil slot portions to an intermediate portion of the rotor, and then exhausted to the air gap. To provide direct cooling of the end turn portions of the winding, the inlet ports have been located at or close to the center of the peripheral section of the coil end. This arrangement, while generally satisfactory, tends to limit the rating of the rotor below what it could be if the end turns were cooled separately from the coil slot portions. This is because the permissible rating of a direct-cooled section of a rotor winding is dependent on the length of the section and the mass of cooling gas flowing through it. With increased length, the gas flowing through the ducts must carry away more heat, but the increased fluid friction between gas and conductor tends to reduce the flow. This requires that the I²R losses per unit length of the coil must be reduced, as the length increases, in order to maintain a given maximum temperature in the conductor. The longer outer coil ends may be considerably handicapped by this effect, while for the shorter inner coil ends it may be of less consequence.

Accordingly, it is an object of this invention to provide an improved ventilation arrangement for effectively cooling the end turn portions of a direct-cooled rotor winding separately from the slot-lying coil side portions to permit an increase in the rating of a generator rotor.

Other objects and advantages will become apparent from the following description and accompanying drawings in which:

Fig. 1 is a perspective view partially in section of a layer of rotor end turns illustrating the flow path of the cooling gas;

Fig. 2 is a plan view showing substantially one half of the layer of end turns and the gas flow for cooling them;

Fig. 3 is a view taken along the lines 3—3 of Fig. 2 plus the fan for directing cooling air to the end turns;

Fig. 4 is a sectional view taken along lines 4—4 of Fig. 2;

Fig. 5 is a sectional view taken along the lines 5—5 of Fig. 2;

Fig. 6 is a sectional plan view illustrating a modified design in which the cooling gas is exhausted out under the centering ring instead of to the air gap; and Fig. 7 is a cross-sectional view taken along the lines 7—7 of Fig. 6.

Generally stated, the invention is practiced by separately cooling the end turns of a generator rotor by a first gas flow supplied intermediate the circumferential section of the end turn and exhausting this gas adjacent the end of the rotor body through appropriate ducts. The slot-lying coil side portions are cooled by a second separate stream of cool gas admitted to the conductor between the end of the rotor body and the aforementioned exhaust from the first gas flow stream. The second gas flow stream is exhausted radially through the rotor into the air gap after passing axially through at least a part of the slot-lying portion of the coils.

The invention is illustrated as being applied to a two-pole synchronous dynamoelectric machine, comprising a stator 30 (Fig. 3) having windings 29 and a rotating field member 1 with an "air-gap" 16 therebetween. The rotating field member 1, as shown in Fig. 1, includes a rotor 1 having winding receiving slots 1a, 1b, 1c, etc. and a distributed, hollow conductor, direct current field winding. Each pole of the field winding comprises a plurality of concentric coils 3, 4, 5, etc., spanning an unslotted pole center portion 2.

Referring now more particularly to Fig. 1, the rotor core 1 is shown cut away to illustrate the end portions of a layer of rotor coils 3, 4, 5, 6. For clarity, only four of the concentrically disposed rotor coils 3, 4, 5, 6 are drawn; although in practice several more are usually used. In Fig. 3, the coils have eight turns each, but such disclosure is illustrative only. Also, these coils are shown as rectangular tubes, but it is obvious that the invention is suitable to any coil construction in which the cooling gas flows in direct contact with the conductor. The coils 3, 4, etc. comprise slot-lying coil portions 3a, 4a, etc. and end turn portions which are numbered 3b, 4b, etc. respectively. The end turns 3b, 4b, etc., are axially located by spacer blocks 18, and maintained against transverse movement by blocks 25–28 located on each side of pole center 2. As will be described in detail later, spacers 27, 28 serve the additional function of providing an exhaust passage for the hot gases after they have cooled the end turns to prevent their mixing with the cool gases directed to the axial portions of the coil windings. The end turns 3b, 4b, etc., are prevented from moving radially due to centrifugal force by retaining ring 12 which is secured to centering ring 11 that is in turn secured to rotor 1 in a conventional manner that is not part of the present invention.

In order to circulate the cooling gas through the rotor windings, the gas is drawn into underspace 24 by the pumping action resulting from rotor rotation which accelerates the gas as it moves from a smaller to a larger diameter, much like the action of a centrifugal fan. This pumping action can be augmented by pressure developed by fan 10 which is secured to flange 1d of rotor 1. The combined action of fan and rotor produces a differential pressure across the portions of the winding to be cooled causing cooling gas to flow. The gas entering the rotor is directed by fan 10 to space 24 located under the end turns through a plurality of sub-slots 1e (see Figs. 2 and 3). The cooling gas from space 24 enters the windings in two distinct regions. One group of inlets 3c, 4c, 5c, 3d, 4d, 5d (Fig. 1) is located near the center of the peripheral section of the windings. A second group of inlets 5g, 6g, 5h, 6h is placed in the axially extending section of the end winding near the end of the rotor body.

In the machine illustrated, coils 3 and 4, the end sections 3b, 4b of which are closest to the end of the rotor body 1, are shown with relatively short axial sections extending beyond the end of the rotor body. Due to the limited space for axially spaced inlet and outlet ports in the axially extending portion of the end section 3b, 4b, it is not feasible to cool these coil ends 3b, 4b in the manner of this invention. However, since these coil ends 3b, 4b are short and gas can enter them in an unencumbered manner, it has been found that it is not an appreciable handicap to the overall arrangement to cool the ends in the manner heretofore known. Accordingly, coils 3 and 4 in the structure shown are provided with inlet openings 3c, 3d and 4c, 4d respectively which receive air from underspace 24 and direct the air circumferentially and axially within coils 3, 4 to a radial exhaust passage 15 within the rotor body from where it is exhausted into the air gap 16 (see Fig. 5). Where it is deemed necessary to cool the ends of the innermost coils separately, sufficient axial space may be provided so that these first two coils 3, 4 might also be cooled in the manner hereinafter disclosed for coils 6, 7, 8, etc.

The axially extending portions of the end turns of the remaining coils 6, 7, 8, etc. in general are long enough to permit the location of outlet and inlet openings therein to permit separate cooling of the coil end turns and slot sections in the manner of this invention. Because of their longer length, the need for such separate cooling is more acute.

Fig. 2 illustrates the cooling of one half of the end turns of one pole, which is duplicated in the other half since the end turns are symmetrical. For a more complete picture, reference is made to Fig. 1, which discloses in perspective the cooling of the complete end turn of coil 5.

Referring now to Fig. 2, consider for example the gas flow for cooling coil 5 which is identical to the cooling arrangement for the other coils 6, 7, 8, etc. Coil 5 is provided with inlet 5c in the circumferential section of the end turn 5b and an outlet 5e for the circumferential section of the end turn in the axial section to exhaust the gas after it has cooled the end turn adjacent the end of the rotor body. A second gas inlet 5g is axially disposed between the outlet 5e and the end of the rotor body and, in general, is located on the side of the conductor opposite the outlet 5e. Outlet 5e is blocked off from the inlet 5g to the slot lying portion 5a of coil 5 by barrier 31, and communicates with discharge passage 32 located between the coils 5, 6. Passage 32 is sealed off from the surrounding gas space on two sides by the axially extending coil sides themselves, and on the other two sides by axially spaced blocks 27, 28 which extend radially at least the full coil depth. The top of passage 32, i. e., the radially outward surface, is sealed off by the retaining ring insulation 29 (Fig. 4) which encloses the assembly and the bottom of passage 32 communicates with opening 9a in the outer surface of a circumferentially extending non-metallic duct 9 (see Fig. 4), which carries the end winding cooling gas back toward the rotor pole center 2. At the pole center 2, closely fitting hoods 21 (Figs. 2 and 3) are placed over the ends of the duct 9. Hoods 21 direct the gas radially outward to the air gap 16 through notches 13 provided in the end of the rotor body 1.

It is to be noted that the discharge passage 32 located between the coils 5 and 6 serves to exhaust the gas that has cooled the end turns from both these coils. Similarly, the coil ends for coils 7 and 8 will be served by a similar exhaust passage located therebetween, etc. All such chambers for a particular pole side exhaust to a common exhaust duct 9.

In the alternate spaces between the axially extending sections of the coil ends, which do not enclose an exhaust passage similar to 32, cooling gas flows up between the coils and over the duct 9, as shown in Fig. 5. The inlets 5g, 6g, 7g (Fig. 2) to the slot extending portions of both adjacent coils are then provided with cooling gas just inward of the end winding discharge ports 5e, 6e, etc.

As seen in Fig. 5, the inlet openings 5g receive cooling gas from underspace 24. The gas entering through inlet 5g flows axially through the coil disposed in the rotor coil slots and discharges radially into the air gap through radially extending exhaust ducts 15 (see Fig. 5). Thus, the cooling gas that enters underspace 24 divides, with part of it entering the inlets 5c, 5d, 6c, 6d, etc. and flows toward the rotor body to cool the end winding portions 5b, 6b, etc., of the outer coils. The gas is then exhausted to the air gap through duct 9 and notch 13. The second part of the cooling gas enters inlets 5g, 6g, etc., to cool the slot enclosed side portions 5a, 6a, etc., of the same coils and is directed into the air gap through radial passage 15. If there are any coils with end dimensions too short to accommodate this arrangement, they are cooled in the heretofore known manner through inlets 3c, 3d, 4c, 4d. In the embodiment shown, only a short slot section at the end of the rotor body is cooled by the gas supplied from the rotor ends, and the main intermediate portion of the rotor is cooled by air admitted from the air gap. The particular details of the arrangement for cooling the rotor in this manner are not shown since they are not part of the present invention. A cooling scheme of this type is more particularly described in U. S. Patent 2,791,707, issued May 7, 1957, to D. M. Willyoung and assigned to the assignee of the present invention. It should be noted, however, that the invention described herein is also suitable for a rotor in which the coil sides are cooled by gas that flows axially through the rotor and discharged near the center of the machine.

The modification disclosed in Fig. 6 is very similar to that disclosed in Figs. 1–5 with the exception that the duct 9 does not empty into the air gap by means of hood 21. Duct 9 is interconnected to exhaust duct 14, which as can be seen in Fig. 7, directs the exhaust gas through slots 1f under the centering ring 11 to the inlet side of fan 10 where it mixes with the cooling gas supplied from the coolers (not shown). Thus it can be appreciated that the end turns can be cooled in the same manner as disclosed with respect to Figs. 1–5 and is not limited to exhausting the gases in a particular direction but is suitable for use where the particular design would require that the gases be exhausted into the air gap 16 or back to the inlet side of the fan 10.

The operation of the invention will be fairly obvious from the foregoing description. Cooling gas is provided by fan 10 to the sub-slot 1a and underspace 24 from where part of it is admitted near the mid-point of the circumferentially extending end turn portions 5b, 6b, etc. of the end turns 5, 6, etc., respectively. The gas then flows circumferentially through the end turns to cool them. After cooling the end turn, the gas is exhausted through outlet 5e in the coil wall and directed through exhaust passage 32 into exhaust duct 9 which directs the gas into the air gap through notches 13 in the pole center 2 as disclosed in Fig. 1, or from duct 9 into exhaust duct 14 which leads back to the inlet side of the fan as disclosed in Fig. 7. The gas directed through slots 13 in the pole center 2 flows into the air gap 15 and then is cooled and recirculated in a conventional manner which is not part of the present invention. The gas directed under the retaining ring to the inlet of the fan is mixed with cooled gas and recirculated. Simultaneously with the cooling of the end turns, cooling gas is directed to inlets 5g, 6g, etc., from where it flows axially down the slot-lying portions of the coils to cool them and then exhausts into the air gap.

A particular advantage of this arrangement is that for any innermost coils which do not employ separate end cooling circuits, the gas stream that enters the coils from underspace 24 is in no way restricted or encumbered by the features of this invention necessary to effect the separate cooling of the other coil ends.

It will thus be seen that the invention provides a means for increasing the effectiveness of generator rotor cooling, and consequently increasing the rating of the rotor members of large turbine-generators.

It will be obvious to those skilled in the art that numerous changes and substitutions of equivalents might be made in the construction of the rotor ventilating cooling scheme disclosed herein. It is, of course, desired to cover by the appended claims all such modifications as fall within the true spirit and scope of the invention.

What I claim as new and desire to secure by Letters Patent of the United States is:

1. A dynamoelectric machine rotor core member having winding slots, hollow conductors disposed in said slots and having end windings including both axially and circumferentially extending portions disposed outside of the rotor core body at at least one end, a retaining ring surrounding the end turns for maintaining them in place against the action of centrifugal force, the end turns and rotor defining a cooling gas intake space therebetween, first gas inlet means in a circumferential portion of the end turns for admitting cooling gas from the intake space into the hollow conductors, first outlet means in the axial portion of at least one of the end turns, exhaust duct means communicating with said first outlet means to direct the gases flowing therefrom away from the intake space, second inlet means in the axially extending portion of the end turn for admitting cooling gas from the intake space to a section of the conductor disposed in the rotor winding slots, barrier means blocking off the first outlet means from the second inlet means, and second outlet means extending through an intermediate portion of the rotor and interconnecting the hollow conductors with the outside of the rotor for venting the cooling gas after it has blown partially through the slot-lying hollow conductor coil side portions.

2. A dynamoelectric machine comprising a stationary armature member and a rotor core member with an air gap therebetween, the rotor core member having winding slots, a distributed hollow conductor direct current field winding disposed in said slots, each pole of the field winding comprising a plurality of concentric coils spanning the pole center and having end windings consisting of axially and circumferentially extending portions disposed outside of the respective ends of the rotor core member, a retaining ring surrounding the end turns for maintaining them in place against the action of centrifugal forces, the end turns and rotor defining a cooling gas intake space therebetween at each end of the rotor, first gas inlet means in the circumferential portion of the end turns for admitting cooling gas into each of the hollow conductors, first outlet means in the axial portion of at least one of the end turns near the rotor core, the pole center defining a notch opening, and exhaust duct means leading from said first outlet means to said notch opening to exhaust the cooling gas into the air gap after it has cooled a portion of the end winding second inlet means in the axially extending portion of the end turn for admitting cooling gas from the intake space through the section of the conductor located in the rotor winding slots, barrier means blocking off the first outlet means from the second inlet means, and second outlet means extending through an intermediate portion of the rotor and interconnecting the hollow conductor with the air gap for venting the cooling gas after it is blown partially through a slot-lying hollow conductor coil side portion.

3. A dynamoelectric machine rotor core member having winding slots, hollow conductors disposed in said slots and having end windings consisting of axially and circumferentially extending portions disposed outside of the rotor core member at at least one end thereof, a retaining ring surrounding the end turns, a centering ring disposed between the retaining ring and the end of the rotor for maintaining the retaining ring in place, the end turns and rotor defining a gas intake space therebetween, fan means secured to the rotor for directing a cooling gas into the intake space, first gas inlet means in the circumferential portion of the end turns for admitting cooling gas into each of the hollow conductors, first outlet means in the axial portion of at least one of the end turns near the rotor core, exhaust duct means leading from said first outlet means under the centering ring to the inlet of the fan, second inlet means in the axially extending portion of the end turn for admitting cooling gas from the intake space to the section of the conductor located in the rotor winding slots, barrier means blocking off the first outlet means from the second inlet means, and second outlet means extending through an intermediate portion of the rotor and interconnecting the hollow conductors with the air gap for venting the cooling gas after it has blown partially through the slot-lying hollow conductor coil side portions.

4. A dynamoelectric machine rotor core member having winding slots, a distributed hollow conductor direct current field winding disposed in said slots, each pole of the field winding comprising a plurality of concentric coils spanning the pole center and having end windings consisting of axially and circumferentially extending portions disposed outside the ends of the rotor core member, a retaining ring surrounding the end turns for maintaining them in place against the action of centrifugal forces, the end turns and rotor defining a cooling gas intake space therebetween, first gas inlet means in the circumferential portion of at least two adjacent end turns for admitting cooling gas therein, first outlet means in the axial portion of the two adjacent end turns near the rotor core, said first outlet means in the adjacent end turns facing each other, and exhaust duct means in communication with said first outlet means and blocked off from said intake space for directing the gases away from said intake space to exhaust the cooling gas from the adjacent conductors after it has cooled the circumferential end winding portion thereof, second inlet means in the axially extending portion of the adjacent end turns for admitting cooling gas from the intake space to a section of the conductor located in the rotor winding slots, barrier means blocking off the first outlet means from the second inlet means, and second outlet means extending through an intermediate portion of the rotor and interconnecting the adjacent hollow conductors with the air gap for venting the cooling gas after it has blown partially through the slot-lying hollow conductor coil side portions of the adjacent coils.

5. A dynamoelectric machine comprising a stationary armature member and a rotor core member with an air gap therebetween, the rotor core member having winding slots, a distributed hollow conductor direct current field winding disposed in said slots, each pole of the field winding comprising a plurality of concentric coils spanning the pole center and having end windings consisting of axially and circumferentially extending portions disposed outside the respective ends of the rotor core member, a retaining ring surrounding the end turns for maintaining them in place against the action of centrifugal forces, the end turns and rotor defining a cooling gas intake space therebetween, first gas inlet means in the circumferential portion of the end turns for admitting forwardly flowing cooling gas into each of the hollow conductors, first outlet means in the axial portion of at least two adjacent end turns near the rotor core, which outlet means face each other, the pole center of the rotor defining a notch opening, and exhaust duct means leading from said first outlet means to said notch opening to exhaust the cooling gas to the air gap after it has cooled a portion of said adjacent end windings, second inlet means in the axially extending portion of the end turn for admitting forwardly flowing cooling gas from the intake space to the section of the adjacent conductors located in the rotor winding slots, barrier means blocking off the first outlet means from the second inlet means, and second outlet means extending through an intermediate portion of the rotor and interconnecting the hollow conductors with the air gap for venting the cooling gas after it has blown partially through the slot-lying hollow conductor coil side portions.

References Cited in the file of this patent

UNITED STATES PATENTS

| | | |
|---|---|---|
| 2,653,255 | Baudry | Sept. 22, 1953 |
| 2,786,951 | Morgan | Mar. 26, 1957 |